United States Patent Office 3,454,615
Patented July 8, 1969

3,454,615
ASYMMETRIC DIALUMINOXANE DERIVATIVES
AND THEIR PREPARATION
Hisaya Tani, Kobe-shi, and Takeo Araki and Takanobu
Aoyagi, Kyoto-shi, Japan, assignors to Chiyoda Kako
Kensetsu Kabushiki Kaisha, Tokyo, Japan, a corporation of Japan
No Drawing. Filed Mar. 28, 1966, Ser. No. 537,706
Claims priority, application Japan, Mar. 29, 1965,
40/18,472
Int. Cl. C07f 5/06
U.S. Cl. 260—448                           2 Claims

ABSTRACT OF THE DISCLOSURE

Asymmetric dialuminoxane derivatives of the formula

are prepared by the reaction of an alkali aluminate of the formula $$R_1R_2AlOM$$

with an alkyl aluminum derivative of the formula

(wherein $R_1$ and $R_2$ represent alkyl, aryl, cycloalkyl or alkaryl, $R_3$, $R_4$ and $R_5$ represent alkyl, aryl, cycloalkyl, aralkyl, or hydrogen, and M represents Na, Li and K) in the molar ratio of 1:1 by dissolving the alkali aluminate in a polar hydrocarbon, preferably toluene or xylene, and then slowly adding an equimolar amount of the alkyl aluminum derivative.

These products are available catalysts for the isotactic polymerization of acetaldehyde.

GENERAL DESCRIPTION OF THE INVENTION

This invention relates to a method of manufacturing dialuminoxane derivatives of the general Formula I

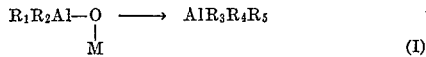  (I)

(wherein $R_1$ and $R_2$ represent alkyl, aryl, cycloalkyl, or alkaryl radicals; $R_3$, $R_4$, and $R_5$ represent alkyl, aryl, cycloalkyl, alkaryl, or hydrogen radicals; and M represents an alkali metal selected from the group consisting of Na, Li, and K) from alkali aluminate derivatives of the general Formula II $$R_1R_2AlOM \qquad (II)$$

(wherein $R_1$, $R_2$ and M have the significance above defined).

Some of the dialuminoxane derivatives of the general Formula I were already known, and they have been manufactured from a reaction system containing trialkylaluminum and alkali hydroxide at a molar ratio of 2:1.

The present inventors have found that this type of dialuminoxane derivatives are most valuable catalysts for isotactic polymerization of acetaldehyde, but have realized that, as long as the derivatives are prepared in the prior art, it is impossible to obtain asymmetric dialuminoxane derivatives. Further, in order to obtain more purified dialuminoxane derivatives than those produced by the usual method, it is necessary to repeat crystallization step several times, and is further suspected that the crystallization steps cause the industrial application to drop in the yield.

As a result of intensive efforts for overcoming the drawbacks of the conventional method which is described above, the present inventors found the method of manufacturing pure dialuminoxane derivatives (I) which embrace asymmetric dialuminoxane derivatives with a very simple operation, and have perfected the present invention on the basis of the said findings.

The present invention pertains to a method of manufacturing dialuminoxane derivatives of the general Formula I from a reaction system containing an alkali aluminate derivative of the general Formula II and an alkylaluminum derivative of the general Formula III $$R_3R_4R_5Al \qquad (III)$$

(wherein $R_3$, $R_4$, and $R_5$ have the same meanings as in the Formula I). The method of manufacturing dialuminoxane derivatives of the general Formula I above is entirely different from the conventional method as hereunder.

According to the method of the invention, an aluminate derivative and an alkylaluminum are reacted with a molar ratio of 1:1 thereby to obtain the objective product, whereas the method heretofore in use consists in reacting a trialkylaluminum and an alkali hydroxide at a molar ratio of 2:1.

DETAILED DESCRIPTION OF THE INVENTION

More specifically, the manufacturing method of the present invention comprises the steps of dissolving an alkali aluminate derivative in an organic solvent which will not irreversibly react with alkylaluminum derivatives, and thereafter adding an alkylaluminum derivative to the solution with stirring at a suitable temperature.

As an organic solvent, this invention may use any suitable one selected from the group of them which will not irreversibly react with alkylaluminum derivatives. Best results are obtained with aromatic hydrocarbons such as toluene and xylene. Pentane, hexane, heptane, and other aliphatic hydrocarbons give nearly as satisfactory results, and, to lesser extents, ether, tetrahydrofuran, and other polar solvents may also be used. The reaction temperature may be at any point within a range of from $-50°$ to $+100°$ C. but preferable results are obtained at the neighborhood of room temperature.

Usually the reaction completes very smoothly in less than 10 minutes.

The reason is explained from the following fact, and it will be understood that the method of the invention provides highly pure dialuminoxane derivatives at high yields.

When triethylaluminum is dropped in a toluene solution of lithium diethylaluminate, a crystalline product is formed almost instantaneously, whereas, in the conventional method, the amount of crystals deposited is merely about from one third to one half on the base of the present invention. Thus, the Li(AlEt$_2$OAlEt$_3$) obtained by the method of the invention is practically as pure as a product obtained by the usual way and further recrystallized once or more. This omission of recrystallizing step has an important significance because it realizes saving of weight loss due to recrystallization (particularly the first recrystallizing step).

It has been known as described hereinbefore that dialuminoxane derivatives of the general Formula I have most desirable applications as an initiator of isotactic polymerization for acetaldehyde. The usage of a highly pure initiator in a polymerization is usually most beneficial for obtaining a high-molecular weight polymer and for improving uniformity and homogeneity of product through inhibition of any secondary reaction which will hinder the polymerization.

Acetaldehyde, polymers are ordinarily defective in their stability, and to overcome the defect has been regarded as an important key to the industrial application. One of the solutions to this problem is the manufacture of high-molecular, uniform isotactic polymers.

To attain this end, the initiator which is used in the reaction is required to be as pure as possible.

Polyacetaldehydes obtained by the present invention can be stretched to make a transparent film. In the untreated state, they can be stored in a stabilized state and are very stiff. Also, by cold drawing, they can be readily formed into filaments.

The asymmetrical dialuminoxane derivatives obtained by the method of the invention, which are all unreported in the literature, can be used as polymerization initiators for acetaldehyde.

The present invention is further illustrated by the following examples.

Example 1

In a reaction vessel in which air was replaced by $N_2$, 21 g. of lithium diethylaluminate was dissolved in 100 ml. of toluene. 23 g. of triethylaluminum was dropped into the solution with stirring at room temperature. Immediately white needles were deposited and the system was solidified. Throughout the reaction, no gas evolution occurred. By heating the solidified system to 70° C., it turned into a homogeneous transparent solution with no trace of solid product. From the product, toluene was distilled off under the reduced pressure, and then unreacted triethylaluminum was ordinarily removed by high vacuum distillation. (At this example, unreacted triethylaluminum was almost not distilled off.) The residue was needles, M.P. 138–142° C. On hydrolysis with dilute sulfuric acid, it evolved 5 mol equivalents of ethane per two aluminum atoms. Analytical value of Al was 23.5% (against calculated value of 24.3%) and that of Li was 3.0% (against 3.15%). By IR and NMR analysis and mixed melting tests, it was found identical with the product obtained and recrystallized in the usual manner. Thus it was identified to be pentaethyl dialuminoxalithium. The yield was 39.3 g. (91%).

Example 2

The same procedure as described in Example 1 was followed except that triethylaluminum was substituted by trimethyl aluminum (16 g.), and crystals were formed in a similar way. Analytical value of Al was 28.4% (against calculated value of 30.0%) and that of Li was 3.3% (against 3.9%). On hydrolysis with dilute sulfuric acid, the above product evolved 2 mol equivalents of ethane and 3 mol equivalents of methane both per two Al atoms. The composition was identified with that of trimethyldiethyl dialuminoxalithium. The yield was 29.5 g. (82%).

Example 3

In the same procedure as in Example 1, except triethylaluminum was substituted by diethylaluminum hydride (18 g.), the reaction proceeded with no evolution of gas. That the reaction took place was confirmed by a slight exothermic change and by the fact that, when toluene was distilled off from the reaction mixture and the residue was subjected to high vacuum distillation, almost no hydrogen diethylaluminum was distilled out. Analytical value of Al was 25.9% (against calculated value of 27.3%) and that of Li was 3.2% (against 3.60%). The yield was 32 g. (85%). On hydrolysis with dilute sulfuric acid, 4 mol equivalents of ethane and 1 mol equivalent of hydrogen evolved per two Al atoms. The composition was identified to be $Li(AlEt_2OAlEt_2H)$.

Example 4

In 20 ml. of toluene, 0.3 g. of pentaethyl dialuminoxalithium obtained in Example 1 was dissolved (when allowed to cool, crystals deposited). After cooling, the solution was used for the polymerization of 20 g. of acetaldehyde at −78° C. for 48 hours. (Immediately upon the addition of acetaldehyde, the reaction system took the form of a solution.) With the addition of a small amount of methanol, the reaction was terminated. The reaction product was immersed in n-hexane for 24 hours, and the insoluble part regarded as the total yield, which was 14.4 g. (72%). When swollen with chloroform, 13.7 g. of the product remained insoluble. When the percentage of the chloroform-insoluble part in the total yield was regarded as the isotacticity percentage, the value was 95%. The chloroform-insoluble part was confirmed by IR analysis to have a polyacetal structure and was identified by an X-ray pattern to be a crystalline polymer having a highly isotactic structure. This polymer could be drawn to a transparent film, and it could be applied to the cold drawing to obtain wire about 7 times as long as the original.

Example 5

With the use of diethyltrimethyl dialuminoxalithium (0.25 g.) prepared in Example 2 as the initiator, 20 g. of acetaldehyde was polymerized in the same manner as described in Example 4. 13.0 g. of a polymer was obtained with an isotacticity percentage of 93%.

Example 6

In the procedure as described in Example 1, except lithium diethylaluminate was substituted by sodium diethylaluminate (24 g.), and a reaction similar to that in Example 3 was carried out. A stable complex compound from which almost no triethylaluminum was distilled off by high vacuum distillation was obtained. The yield was 40.5 g. (88%). On hydrolysis with dilute sulfuric acid, 5 mol equivalents of ethane evolved per 2 Al atoms. Analytical value of Al was 23.2% (against calculated value of 22.7%) and that of Na was 9.2% (against 9.7%). The composition was identical with $$Na(AlEt_2OAlEt_3)$$

When 0.35 g. of pentaethyl dialuminoxasodium thus obtained was used for the polymerization of 20 g. of acetaldehyde in the same manner as in Example 4, a total yield was 14.8 g. (74.0%) and an isotactic percentage was 91.7%.

We claim:
1. A method for preparing an asymmetric aluminum containing organometallic compound having the formula

$$R_1R_2Al-O \longrightarrow AlR_3R_4R_5$$
$$|$$
$$M$$

wherein $R_1$ and $R_2$ each represents alkyl, aryl, cycloalkyl, or alkaryl radicals; $R_3$, $R_4$, and $R_5$ each represents alkyl, aryl, cycloalkyl, alkaryl, or hydrogen; and M represents an alkali metal selected from the group consisting of Na, Li and K which comprises reacting an alkali aluminate compound of the general formula $$R_1R_2AlOM$$

wherein $R_1$, $R_2$, and M have the meanings defined above; with an alkylaluminum compound of the formula $$R_3R_4R_5Al$$

wherein $R_3$, $R_4$, and $R_5$ have the meanings defined above, provided that $R_1$, $R_2$, $R_3$, $R_4$ and $R_5$ are not all the same.

2. An organoaluminum compound having the formula:

$$R_1R_2Al-O \longrightarrow AlR_3R_4R_5$$
$$|$$
$$M$$

wherein $R_1$ and $R_2$ represent alkyl, aryl, cycloalkyl or alkaryl, $R_3$, $R_4$ and $R_5$ represent alkyl, aryl, cycloalkyl, aralkyl, or hydrogen, and M represents Na, Li and K, provided that $R_1$, $R_2$, $R_3$, $R_4$ and $R_5$ are not all the same.

References Cited
UNITED STATES PATENTS 3,306,923  2/1967  Wetroff et al. _____ 260—448

OTHER REFERENCES

Tani et al.: J. Polymer Science (Polymer Letters), vol. 2B, pp. 921 to 924 (1964).

TOBIAS E. LEVOW, *Primary Examiner.*

H. M. S. SNEED, *Assistant Examiner.*

U.S. Cl. X.R.

252—431; 260—67